US012699788B2

(12) United States Patent
Dror et al.

(10) Patent No.: US 12,699,788 B2
(45) Date of Patent: Aug. 4, 2026

(54) SECURE ACCESS TO MEMORY IN AN INTEGRATED CIRCUIT

(71) Applicant: Marvell Israel (M.I.S.L) Ltd., Yokneam (IL)

(72) Inventors: Nitzan Dror, Ramot Hashavim (IL); Roman Nos, Petah Tikva (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 9 days.

(21) Appl. No.: 18/882,472

(22) Filed: Sep. 11, 2024

(65) Prior Publication Data

US 2025/0086297 A1 Mar. 13, 2025

Related U.S. Application Data

(60) Provisional application No. 63/537,668, filed on Sep. 11, 2023.

(51) Int. Cl.
| | |
|---|---|
| *G06F 21/00* | (2013.01) |
| *G06F 21/60* | (2013.01) |
| *G06F 21/79* | (2013.01) |
| *G06F 21/85* | (2013.01) |

(52) U.S. Cl.
CPC ............ *G06F 21/606* (2013.01); *G06F 21/79* (2013.01); *G06F 21/85* (2013.01)

(58) Field of Classification Search
None
See application file for complete search history.

(56) References Cited

U.S. PATENT DOCUMENTS

| | | | |
|---|---|---|---|
| 7,877,805 | B1 | 1/2011 | Loc |
| 8,099,629 | B2 | 1/2012 | Feng |
| 8,171,309 | B1 | 5/2012 | Poo |
| 8,332,931 | B1 | 12/2012 | Tran |
| 8,645,716 | B1 | 2/2014 | Dujari |
| 8,661,266 | B2 | 2/2014 | Hakkarainen |
| 8,677,144 | B2 | 3/2014 | Haider et al. |
| 8,751,786 | B1 | 6/2014 | Feng |
| 8,935,534 | B1 | 1/2015 | Hutchison |
| 8,990,552 | B2 | 3/2015 | Kondapalli |
| 9,009,497 | B1 | 4/2015 | Feng |
| 9,037,875 | B1 | 5/2015 | Poo |
| 9,042,308 | B2 | 5/2015 | Zhao |
| 9,064,135 | B1 | 6/2015 | Poo |

(Continued)

OTHER PUBLICATIONS

International Search Report and Written Opinion for PCT No. PCT/IB/2024/000499, mailed Dec. 23, 2024. (16 pages).

*Primary Examiner* — Andrew J Steinle

(57) ABSTRACT

An integrated circuit (IC) chip includes a first memory that stores first information, and a second memory that stores second information that it to be protected from unauthorized access. Communication interface circuitry gives a processor external to the IC chip read access and/or write access to components of the IC chip. Embedded hardware security circuitry selectively provides the processor external to the IC chip with secure access to the second memory. Interconnect circuitry i) selectively grants the processor unsecured access to the first memory via the communication interface circuitry, ii) selectively grants the processor access to the embedded hardware security, and iii) limits access to the second memory.

22 Claims, 3 Drawing Sheets

(56)　　　　　References Cited

U.S. PATENT DOCUMENTS

| | | | |
|---|---|---|---|
| 9,081,963 B1 | 7/2015 | Sima | |
| 9,098,694 B1 | 8/2015 | Moss | |
| 9,202,040 B2 | 12/2015 | Rosenblatt | |
| 9,219,722 B2 | 12/2015 | Chellappa | |
| 9,251,380 B1 | 2/2016 | Au | |
| 9,306,916 B2 | 4/2016 | Snyder | |
| 9,413,356 B1 | 8/2016 | Mckinley | |
| 9,571,279 B2 | 2/2017 | Kancharla | |
| 9,590,636 B1 | 3/2017 | Mckinley | |
| 9,602,532 B2 | 3/2017 | Goyal | |
| 9,626,513 B1 | 4/2017 | Aytek | |
| 9,747,146 B2 | 8/2017 | Huang | |
| 9,785,403 B2 | 10/2017 | Goyal | |
| 10,193,694 B1 | 1/2019 | Guditz | |
| 10,250,571 B2 | 4/2019 | Manapragada | |
| 10,425,234 B2 | 9/2019 | Kancharla | |
| 10,521,618 B1 | 12/2019 | Zhang | |
| 10,623,290 B2 | 4/2020 | Kniplitsch | |
| 10,979,412 B2 | 4/2021 | Lambert | |
| 11,513,958 B1 | 11/2022 | Mukherjee | |
| 2009/0217058 A1 | 8/2009 | Obereiner et al. | |
| 2016/0321458 A1 | 11/2016 | Zhang | |
| 2020/0099669 A1 | 3/2020 | Kessler | |
| 2021/0232337 A1 | 7/2021 | Talvitie et al. | |
| 2022/0067221 A1* | 3/2022 | Schiattarella | H04L 9/088 |
| 2023/0057638 A1* | 2/2023 | Duval | G06F 21/79 |
| 2024/0235820 A1 | 7/2024 | Parmar | |

* cited by examiner

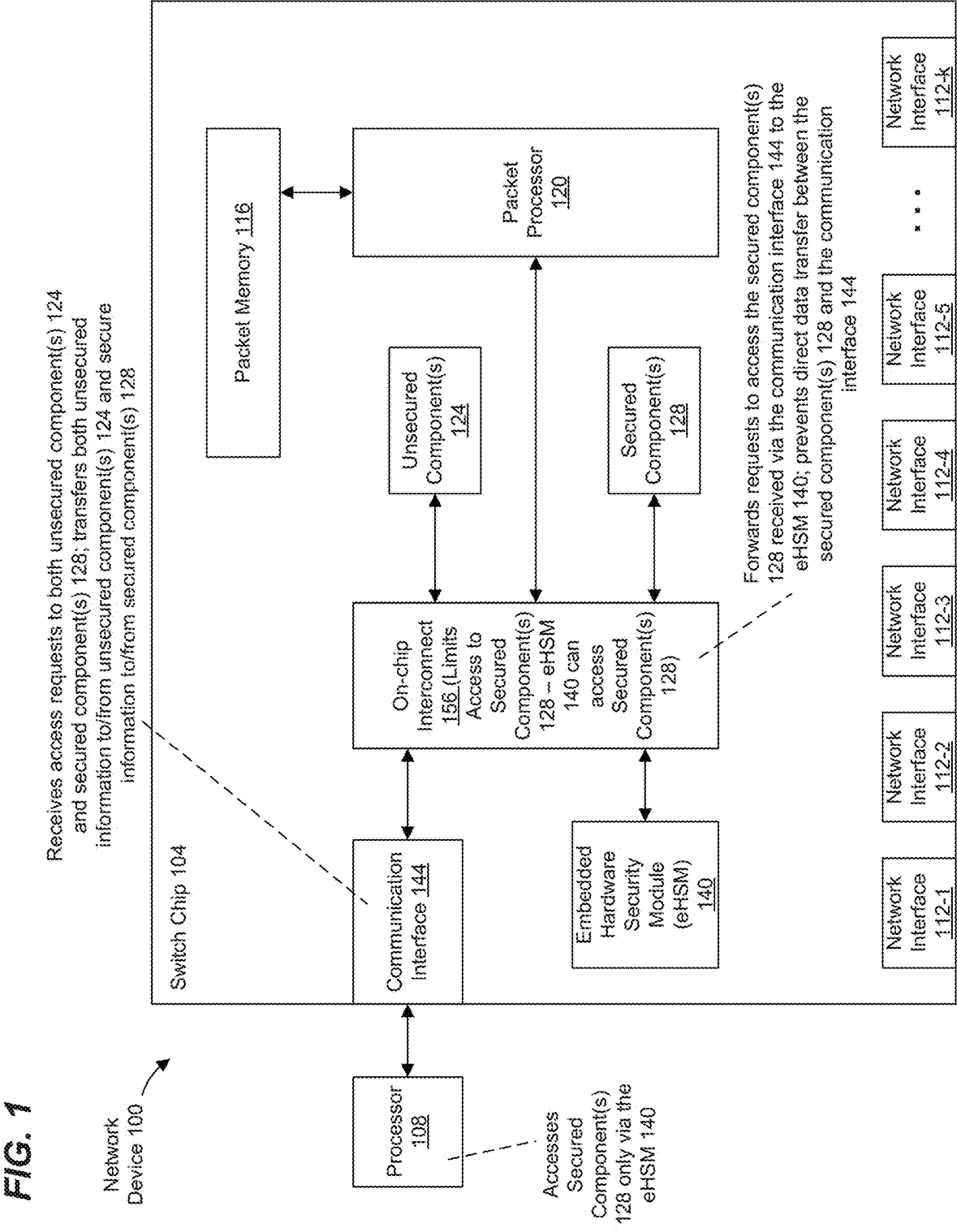

*FIG. 1*

Network Device 100

Switch Chip 104

Receives access requests to both unsecured component(s) 124 and secured component(s) 128; transfers both unsecured information to/from unsecured component(s) 124 and secure information to/from secured component(s) 128

Forwards requests to access the secured component(s) 128 received via the communication interface 144 to the eHSM 140; prevents direct data transfer between the secured component(s) 128 and the communication interface 144

Accesses Secured Component(s) 128 only via the eHSM 140

Processor 108

Communication Interface 144

On-chip Interconnect 156 (Limits Access to Secured Component(s) 128 – eHSM 140 can access Secured Component(s) 128)

Embedded Hardware Security Module (eHSM) 140

Unsecured Component(s) 124

Secured Component(s) 128

Packet Memory 116

Packet Processor 120

Network Interface 112-1

Network Interface 112-2

Network Interface 112-3

Network Interface 112-4

Network Interface 112-5

Network Interface 112-k

*FIG. 3*

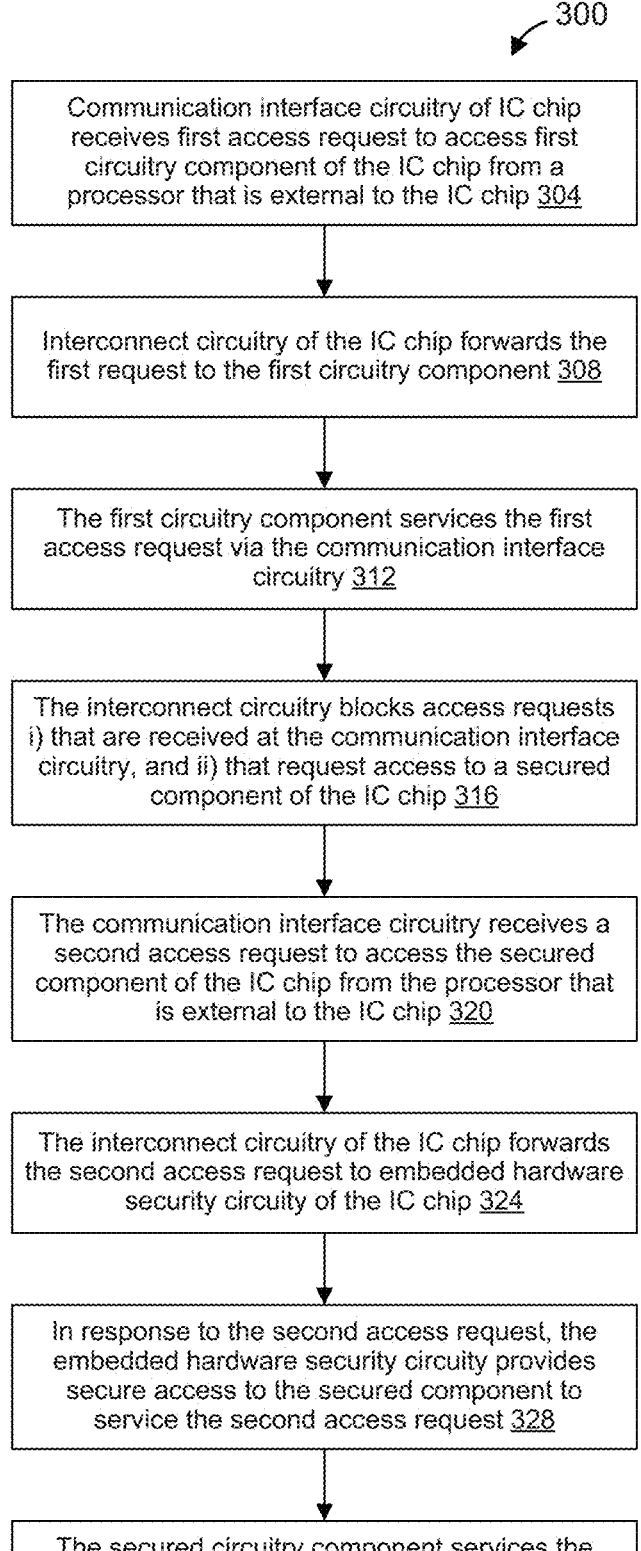

300

Communication interface circuitry of IC chip receives first access request to access first circuitry component of the IC chip from a processor that is external to the IC chip 304

Interconnect circuitry of the IC chip forwards the first request to the first circuitry component 308

The first circuitry component services the first access request via the communication interface circuitry 312

The interconnect circuitry blocks access requests i) that are received at the communication interface circuitry, and ii) that request access to a secured component of the IC chip 316

The communication interface circuitry receives a second access request to access the secured component of the IC chip from the processor that is external to the IC chip 320

The interconnect circuitry of the IC chip forwards the second access request to embedded hardware security circuity of the IC chip 324

In response to the second access request, the embedded hardware security circuity provides secure access to the secured component to service the second access request 328

The secured circuitry component services the second access request via the embedded hardware security circuitry and the communication interface circuitry 332

SECURE ACCESS TO MEMORY IN AN INTEGRATED CIRCUIT

CROSS REFERENCES TO RELATED APPLICATIONS

This application claims the benefit of U.S. Provisional Patent App. No. 63/537,668, entitled "Secure Address Space," filed on Sep. 11, 2023, the disclosure of which is expressly incorporated herein by reference in its entirety for all purposes.

FIELD OF TECHNOLOGY

The present disclosure relates generally to communication networks, and more particularly to providing secure access to a memory of a network device.

BACKGROUND

Cyberattacks continue to increase in sophistication and effectiveness. Large amounts of critical information are housed in and/or pass through data centers, and thus data centers are a natural target for hackers. As a result, there is a growing concern over the disruption of data centers, and illicit interception and collection of critical, private information in data centers. The use of end-to-end encryption helps protect data centers from disruption and helps protect information that passes through data centers.

Attackers can disrupt communication networks, such as those in data centers, in a variety of ways. For example, attackers can eavesdrop on management messages between network switches to steal sensitive information, send malicious packets that masquerade as coming from a trusted network device, etc. As a more specific example, an attacker can exploit use of the Precision Time Protocol (PTP), which is often employed to synchronize actions taken by multiple different network devices in a network. One aspect of PTP involves network devices exchanging timing packets to synchronize clocks of the network devices. Communication networks using PTP sometimes can be disrupted by illicitly collecting information from such timing packets and using the stolen information to send malicious packets that prevent network devices from properly synchronizing.

One way to mitigate against such attacks is to encrypt communications between network devices within a communication network. The Media Access Control Security (MACsec) is a network security standard, defined by Institute for Electrical and Electronics Engineers (IEEE), which provides authenticated and encrypted communications between Ethernet-connected devices. With MACsec, two connected network devices exchange and verify security keys to establish a secure link, and use the keys to perform authentication, encryption, and decryption.

Network security keys, such as used for authentication, encryption, and/or decryption are critical information that, in the wrong hands, can result in serious consequences, ranging from network disruptions that slow throughput to theft of sensitive data. Thus, network security keys are often stored in secure locations with limited access.

SUMMARY

In an embodiment, an integrated circuit (IC) chip comprises: one or more first memories, the one or more first memories configured to store first information; one or more second memories, the one or more second memories configured to store second information that it to be protected from unauthorized access; communication interface circuitry that is configured to give a processor external to the IC chip read access and/or write access to components of the IC chip; embedded hardware security circuitry coupled to the communication interface circuitry, the embedded hardware security circuitry configured to selectively provide the processor external to the IC chip with secure access to the one or more second memories; and interconnect circuitry that is coupled to i) the one or more first memories, ii) the communication interface circuitry, and iii) the embedded hardware security circuitry, the interconnect circuitry configured to i) selectively grant the processor unsecured access to the one or more first memories via the communication interface circuitry, ii) selectively grant the processor access to the embedded hardware security, and iii) limit access to the one or more second memories.

In another embodiment, a method for accessing an IC chip includes: receiving, at communication interface circuitry of the IC chip, a first memory access request to access a first memory of the IC chip from a processor that is external to the IC chip; forwarding, by interconnect circuitry of the IC chip, the first request to the first memory; servicing, by the first memory, the first memory access request via the communication interface circuitry; blocking, at the interconnect circuitry, direct access to a second memory of the IC chip via the communication interface circuitry in response to requests i) that are received at the communication interface circuitry, and ii) that request access to the second memory of the IC chip, the second memory configured to store information that it to be protected from unauthorized external access; receiving, at communication interface circuitry of the IC chip, a second memory access request to access the second memory of the IC chip from the processor that is external to the IC chip; forwarding, by the interconnect circuitry of the IC chip, the second request to embedded hardware security circuitry of the IC chip; selectively providing, by the embedded hardware security circuitry, secure access to the second memory to service the second memory access request; and servicing, by the second memory, the second memory access request via the embedded hardware security circuitry and the communication interface circuitry.

BRIEF DESCRIPTION OF THE DRAWINGS

FIG. 1 is a simplified diagram of an example network device that includes an integrated circuit (IC) chip communicatively coupled to a processor, wherein the IC chip includes a communication interface that provides the processor with both i) access to an unsecured component of the IC chip, and ii) secure access to a secured component of the IC chip, according to an embodiment.

FIG. 3 is a flow diagram of an example method for accessing an unsecured component of an IC chip and securely accessing a secure component of the IC chip via a same communication interface of the IC chip, according to an embodiment.

DETAILED DESCRIPTION

Figure 2:
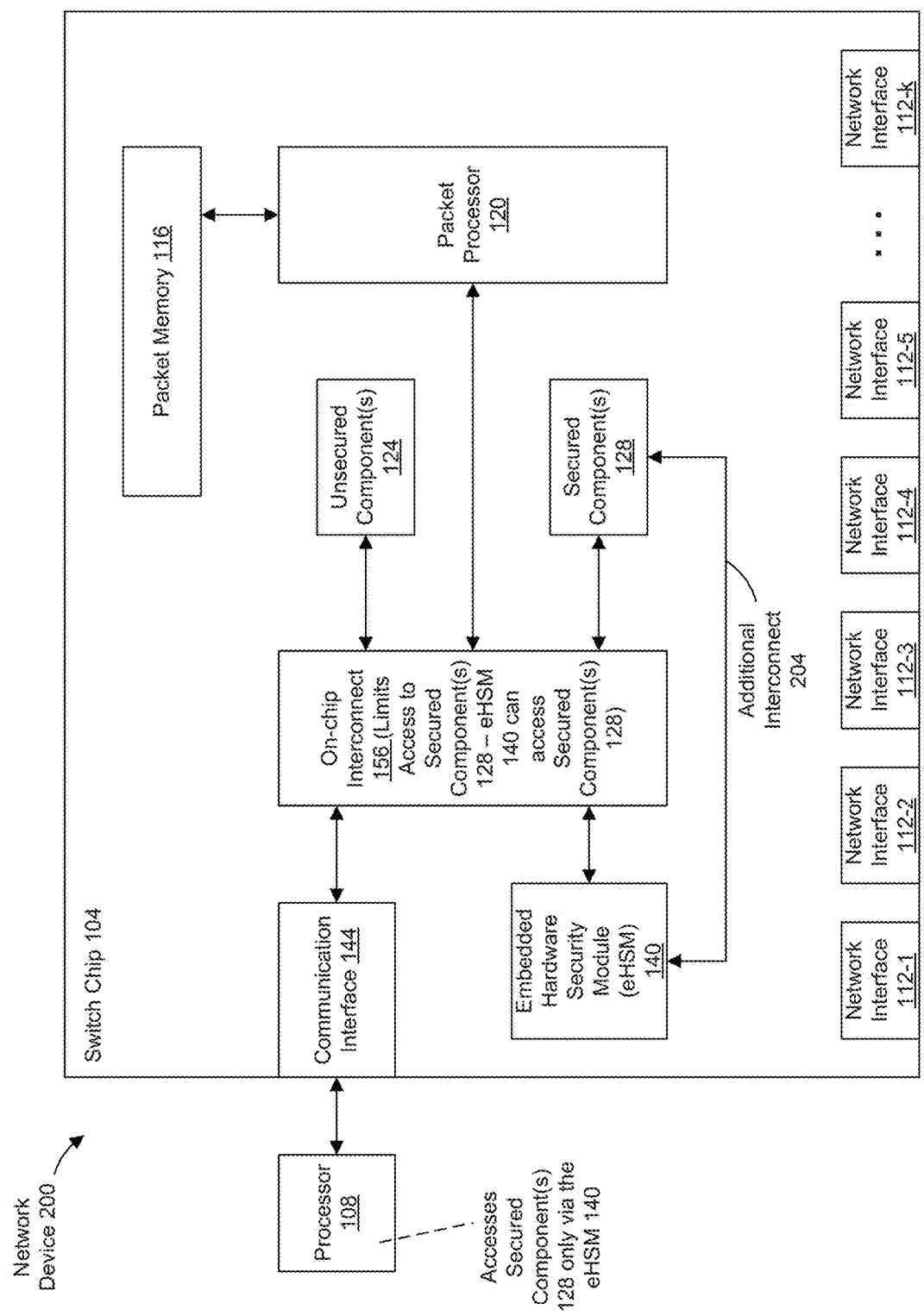
FIG. 2 is a simplified diagram of another example network device which an IC chip includes a communication interface that provides a processor with both i) access to an unsecured component of the IC chip, and ii) secure access to a secured component of the IC chip, according to another embodiment.

In embodiments described below, an integrated circuit (IC) chip has an architecture that provides a processor external to the IC chip both i) unsecured access to one or more first components (e.g., first memories) of the IC chip, and ii) secured access to one or more second components (e.g., second memories) via a single communication interface. As an illustrative example, the one or more second components includes one or more second memories configured to store second information that is to be protected from unauthorized external access, such as keys for performing one or more of authentication, encryption, and decryption. Because the processor obtains both i) unsecured access to the one or more first components, and ii) secured access to one or more second components via the single communication interface, the cost of the IC chip, chip area, and/or pin counts are reduced as compared to architectures in which an IC chip provides separate communication interfaces for unsecured access and secured access, at least in some embodiments.

In some embodiments, the IC chip also includes embedded hardware security circuitry coupled to the communication interface, the embedded hardware security circuitry configured to i) authenticate the processor external to the IC chip, and ii) in response to authenticating the processor external to the IC chip, provide the processor external to the IC chip with secure access to the one or more second components. The embedded hardware security circuitry is also configured to, in response to failing to authenticate the processor external to the IC chip, prevent the processor external to the IC chip from accessing the one or more second components, in an embodiment. The embedded hardware security circuitry includes encryption circuitry and/or decryption circuitry that the embedded hardware security circuitry uses to authenticate the processor external to the IC chip and/or to provide encrypted communications between the IC chip and the processor when the processor is accessing the one or more second components of the IC chip, in some embodiments.

In some embodiments, the IC chip is used in the context of network devices such as network switches, routers, etc., and embodiments are described below in the context of a network switch for explanatory purposes. In other embodiments, similar IC chips are used in other contexts that utilize IC chips provide i) unsecured access to one or more first components (e.g., first memories), and ii) secured access to one or more second components (e.g., second memories).

FIG. 1 is a simplified diagram of an example network device 100 that includes an IC chip 104 communicatively coupled to a processor 108, according to an embodiment. The network device 100 corresponds to a network switch, a router, etc., and the IC chip 104 is sometimes referred to herein as a "switch chip." The switch chip 104 is included within in a suitable chip package having suitable external interconnect structures for inputting and outputting signals to/from the switch chip 104, such as a ball grid array (BGA), a pin grid array (PGA), a land grid array (LGA), etc. The processor is electrically connected to the switch chip 104 via external interconnect structures of the chip package, in an embodiment.

The switch chip 104 includes a plurality of network interfaces 112 communicatively coupled to ports (not shown) of the network device 100. The switch chip 104 also includes a memory 116 to store packet data corresponding to packets received via the network interfaces 112 and a packet processor 120 configured to analyze at least packet header data of packets received via the network interfaces 112 to determine network interfaces 112 via which the packets are to be forwarded.

The switch chip 104 also includes one or more first components 124 (sometimes referred to herein as "unsecured component(s)") and one or more second components 128 (sometimes referred to herein as "secured component(s)"). In an embodiment, the unsecured component(s) 124 comprise one or more circuitry components to which the host processor 108 is provided unsecured access, and the secured component(s) 128 comprise one or more circuitry components to which the host processor 108 is provided secure access. Providing secure access to the secured component(s) 128 comprises the switch chip 104 performing an authentication procedure with the processor 108 before permitting the processor 108 to access the secured component(s) 128, in an embodiment. Providing secure access to the secured component(s) 128 additionally or alternatively comprises the switch chip 104 i) encrypting information from the secured component(s) 128 and providing the encrypted information to the processor 108 and/or ii) decrypting information from the processor 108 and providing the decrypted information to the secured component(s) 128, in another embodiment.

The unsecured component(s) 124 comprise one or more first memories, and providing unsecured access to the one or more first memories comprises providing the processor 108 with read access and/or write access to the one or more first memories, in an embodiment. Additionally or alternatively, the secured component(s) 128 comprise one or more second memories, and providing secure access to the one or more second memories comprises providing the processor 108 with read access and/or write access to the one or more second memories, in an embodiment.

An embedded hardware security module (eHSM) 140 is configured to perform an authentication procedure with the processor 108. The authentication procedure involves the eHSM 140 decrypting information that was received from the processor 108 using a key associated with the processor 108, and comparing the decrypted information to information known to the eHSM 140, in an embodiment. The authentication procedure additionally or alternatively involves the eHSM 140 encrypting information that was received from the processor 108 using a key associated with the processor 108, and comparing the encrypted information to information known to the eHSM 140, in another embodiment.

The authentication procedure additionally involves the processor 108 and the eHSM 140 transferring one or more keys, that the processor 108 and/or the eHSM 140 use for encrypting/decrypting communications between the processor 108 and the eHSM 140. In other embodiments, the authentication procedure performed by the eHSM 140 additionally or alternatively includes one or more other suitable operations.

The eHSM 140 includes encryption/decryption circuitry (not shown), and the eHSM 140 is configured to use the encryption/decryption circuitry to encrypt information that is output by the switch chip 104 (e.g., to the processor 108) and to decrypt information that is received by the switch chip 104 (e.g., from the processor 108), in an embodiment. The eHSM 140 includes one or more memories (e.g., one or more of: i) one or more registers, ii) one or more random access memories (RAMs), iii) one or more read-only memories (ROMs), iv) a solid state memory, v) electronic fuses (eFuses), etc.) that are configured to store keys used for one or more of authentication, encryption, decryption, etc. In some embodiments, the one or more memories are additionally configured to store a unique identifier (e.g., a globally unique identifier (GUID), a media access control (MAC)

address, etc.). In some embodiments, the one or more memories are additionally configured to store boot code (i.e., firmware instructions) for a boot procedure performed by the processor 108.

In some embodiments, the eHSM 140 includes an embedded processor (not shown) that is configured to execute machine readable instructions (e.g., software and/or firmware instructions) stored in the one or memories. The machine readable instructions, when executed by the embedded processor, cause the embedded processor to perform operations such as one or more of i) perform the authentication procedure with the processor 108, ii) prompt the encryption/decryption circuitry to encrypt information to be output by the switch chip 104, iii) prompt the encryption/decryption circuitry to decrypt information received by the switch chip 104, iv) provide boot code to the processor 108 as part of a boot procedure performed by the processor 108, according to various embodiments.

The switch chip 104 includes communication interface circuitry 144 that is configured to facilitate the processor 108 communicating with the switch chip 104. In an embodiment, the communication interface circuitry 144 includes peripheral component interconnect express (PCIe) circuitry that is configured to operate according to the PCIe standard.

The switch chip 104 further includes an on-chip interconnect 156 that interconnects various components of the switch chip 104 to facilitate transferring information between the various components of the switch chip 104. Additionally, the on-chip interconnect 156 is configured to limit access to one or more other components of the switch chip 104. For example, the on-chip interconnect 156 is configured to limit access to the secured component(s) 128 to a subset of the other components connected to the on-chip interconnect 156. As an illustrative example, the on-chip interconnect 156 is configured to not permit (i.e., to block) the communication interface 144 from accessing the secured component(s) 128 directly, but is configured to permit one or more other components of the switch chip 140, such as the eHSM 140, to access the secured component(s) 128.

Regarding the communication interface 144, the on-chip interconnect 156 is configured to i) permit the communication interface 144 to access a first subset of components of the switch chip 104, such as the unsecured component(s) 124 and the eHSM 140, and ii) to block direct access to a second subset of components, such as the secured component(s) 128. On the other hand, the on-chip interconnect 156 is configured to permit the eHSM 140 to access the second subset of components, such as the secured component(s) 128. In an embodiment, the eHSM 140 facilitates the processor 108 to access the secured component(s) 128 via the communication interface 144 when the eHSM 140 has authenticated the processor 108, and prevents the processor 108 from accessing the secured component(s) 128 via the communication interface 144 when the eHSM 140 fails to authenticate the processor 108. In this manner, the eHSM 140 helps to thwart an attacker from accessing secure information in the secured component(s) 128 by replacing or bypassing the processor 108 with a malign processor and attempting to extract secure information from the secured component(s) 128 via the communication interface 144, in some embodiments.

In an embodiment in which the secured component(s) 128 include one or more secured memories, the processor 108 provides to the eHSM 140, via the communication interface 144, a write request to write data to one or more secure memories 128 after the eHSM 140 has authenticated the processor 108. In an embodiment, the processor 108 encrypts the data that is to be written to the one or more secure memories prior to transferring the data to the eHSM 140 via the communication interface 144, and the eHSM 140 decrypts the data. In response to receiving the write request from the processor 108 via the communication interface 144, the eHSM 140 accesses the one or more secure memories 128 via the on-chip interconnect to write the data to the one or more secure memories 128.

In another embodiment in which the secured component(s) 128 include one or more secured memories, the processor 108 provides to the eHSM 140, via the communication interface 144, a request to read data from the one or more secure memories 128 after the eHSM 140 has authenticated the processor 108. In response to receiving the read request from the processor 108 via the communication interface 144, the eHSM 140 accesses the one or more secure memories 128 via the on-chip interconnect 156 to read data from the one or more secure memories 128. In an embodiment, the eHSM 140 encrypts the data prior to transferring the data to the processor 108 via the communication interface 144, and the processor 108 decrypts the data.

In some embodiments, the packet processor 120 includes encryption/decryption circuitry configured to encrypt packet information in packets to be forwarded via the network interfaces 112 and/or to decrypt packet information in packets received via the network interfaces 112. For example, the encryption/decryption circuitry is used in connection with one or more of: i) the Internet Protocol Secure (IPsec) group of protocols, which involve encryption of payloads of Internet Protocol (IP) packets; ii) the Media Access Control Security (MACsec) network security standard; iii) another suitable protocol that involves encryption and decryption of packet data, etc.

In some such embodiments, one or more memories of the secured component(s) 128 store keys that are used by the encryption/decryption circuitry of the packet processor 120 for encryption and/or decryptions, and the packet processor 120 obtains the keys from the one or more secured memories 128 via the on-chip interconnect 156. To facilitate the packet processor 120 obtaining the keys from the one or more secured memories 128, the packet processor 120 is connected to the on-chip interconnect 156, and the on-chip interconnect 156 permits the packet processor 120 to access the one or more secured memories 128, according to some embodiments.

In other embodiments, each of at least some of the network interfaces 112 includes encryption/decryption circuitry configured to encrypt packet information in packets to be forwarded off chip by the network interfaces 112 and/or to decrypt packet information in packets received from off chip by the network interfaces 112. For example, the encryption/decryption circuitry is used in connection with one or more of: i) the IPsec group of protocols; ii) the MACsec network security standard; iii) another suitable protocol that involves encryption and decryption of packet data, etc.

In some such embodiments, one or more memories of the secured component(s) 128 store keys that are used by the encryption/decryption circuitry of the network interfaces 112 for encryption and/or decryptions, and the at least some network interfaces 112 obtain the keys from the one or more secured memories 128 via the on-chip interconnect 156. To facilitate the at least some network interfaces 112 obtaining the keys from the one or more secured memories 128, the at least some network interfaces 112 are connected to the on-chip interconnect 156, and the on-chip interconnect 156 permits the at least some network interfaces 112 to access the one or more secured memories 128, according to some embodiments.

In some embodiments in which the switch chip 104 encrypts and decrypts packet information, the keys used for encryption/decryption are to be updated from time to time (e.g., periodically). Thus, in some embodiments, keys stored in the one or more secure memories 128 and used for encryption/decryption are updated by the processor 108 from time to time (e.g., periodically), and the processor 108 uses techniques such as described above to update keys stored in the one or more secure memories 128 via the eHSM 140.

In some embodiments, one or more memories of the secured component(s) 128 store forwarding information that are used by the packet processor 120 for determining network interfaces 112 via which packets are to be forwarded. For example, in some scenarios it is important to keep access to the forwarding information secure. In such embodiments, the processor 108 provides to the eHSM 140, via the communication interface 144, a request to read forwarding information from the one or more secure memories 128 after the eHSM 140 has authenticated the processor 108. In response to receiving the read request from the processor 108 via the communication interface 144, the eHSM 140 accesses the one or more secure memories 128 via the on-chip interconnect 156 to read forwarding from the one or more secure memories 128. In an embodiment, the eHSM 140 encrypts the forwarding information prior to transferring the forwarding information to the processor 108 via the communication interface 144, and the processor 108 decrypts the forwarding information.

In another embodiment, the processor 108 additionally or alternatively provides to the eHSM 140, via the communication interface 144, a write request to write forwarding information to one or more secure memories 128 after the eHSM 140 has authenticated the processor 108. In an embodiment, the processor 108 encrypts the forwarding information that is to be written to the one or more secure memories prior to transferring the forwarding information to the eHSM 140 via the communication interface 144, and the eHSM 140 decrypts the forwarding information. In response to receiving the write request from the processor 108 via the communication interface 144, the eHSM 140 accesses the one or more secure memories 128 via the on-chip interconnect to write the forwarding information to the one or more secure memories 128.

In some embodiments, to facilitate the packet processor 120 obtaining forwarding information from the one or more secured memories 128, the packet processor 120 is connected to the on-chip interconnect 156, and the on-chip interconnect 156 permits the packet processor 120 to access the one or more secured memories 128, according to some embodiments, such as in response to read requests and/or write requests from the packet processor 120.

In some embodiments, one or more memories of the unsecured component(s) 124 store forwarding information that are used by the packet processor 120 for determining network interfaces 112 via which packets are to be forwarded. For example, in some scenarios it is not desired to keep access to the forwarding information secure. In such embodiments, the processor 108 provides, via the communication interface 144, a request to read forwarding information from the one or more memories 124, and in response to receiving the read request from the processor 108 via the communication interface 144, the on-chip interconnect provides the processor 108 with access the one or more memories 124. In some embodiments, the processor 108 provides, via the communication interface 144, a request to write forwarding information to the one or more memories 124, and in response to receiving the write request from the processor 108 via the communication interface 144, the on-chip interconnect provides the processor 108 with access the one or more memories 124. In an embodiment, the processor 108 may receive forwarding information from another network device (as part of a procedure for sharing forwarding information amongst different network devices, for example), and send write requests via the communication interface 144 to write the forwarding information in the one or more memories 124.

As described above, the processor 108 can access both i) the unsecured component(s) 124 and ii) the secured component(s) 128 via the same communication interface 144. For example, the on-chip interconnect 156 directs access requests for unsecured component(s) 124 received via the communication interface 144 to the unsecured component(s) 124, and directs access requests for the secured component(s) 128 received via the communication interface 144 to the eHSM 140, in an embodiment. Access by the processor 108 to the secured component(s) 128 is permitted to occur only after the eHSM 140 has authenticated the processor 108, thus mitigating a threat of unauthorized access to the secured component(s) 128, at least in some embodiments. Additionally, information transferred via the communication interface 144 in connection with the processor 108 accessing the secured component(s) 128 is encrypted, in some embodiments. On the other hand, information transferred via the communication interface 144 in connection with the processor 108 accessing the unsecured component(s) 124 is unencrypted, in some embodiments. Thus, the processor 108 can access the unsecured component(s) 124 via the communication interface 144 without the processor 108 having to encrypt and/or decrypt data and without the switch chip 104 having to encrypt and/or decrypt data, thus saving power and/or increasing speed of the transfer, at least in some embodiments.

FIG. 2 is a simplified diagram of another example network device 200, according to another embodiment. The network device 200 is similar to the network device 100 of FIG. 1, and like-numbered elements are not described again in detail for purposes of brevity.

In the example network device 200, the switch chip 104 includes an additional interconnect 204 between the eHSM 140 and the secure component(s) 128, and the eHSM 140 is configured to access the secure component(s) 128 via the additional interconnect 204, the additional interconnect 204 being distinct from the on-chip interconnect 156.

As with embodiment of FIG. 1, the eHSM 140 facilitates the processor 108 to access the secured component(s) 128 via the communication interface 144 when the eHSM 140 has authenticated the processor 108. More specifically, the eHSM 140 facilitates the processor 108 to access the secured component(s) 128 via the communication interface 144 and via the additional interconnect 204 when the eHSM 140 has authenticated the processor 108.

In an embodiment in which the secured component(s) 128 include one or more secured memories, the processor 108 provides to the eHSM 140, via the communication interface 144, a write request to write data to one or more secure memories 128 after the eHSM 140 has authenticated the processor 108. In an embodiment, the processor 108 encrypts the data that is to be written to the one or more secure memories prior to transferring the data to the eHSM 140 via the communication interface 144, and the eHSM 140 decrypts the data. In response to receiving the write request from the processor 108 via the communication interface 144, the eHSM 140 accesses the one or more secure memories 128 via the additional interconnect 204 to write the data to the one or more secure memories 128. If an attacker captures data being transferred via the communication interface 144, the captured data will not be useful to the attacker because the data being transferred is encrypted. Thus, encrypting the data transferred via the communication interface 144 mitigates a potential attack involving capturing data being transferred via the communication interface 144.

In another embodiment in which the secured component(s) 128 include one or more secure memories, the processor 108 provides to the eHSM 140, via the communication interface 144, a request to read data from the one or more secure memories 128 after the eHSM 140 has authenticated the processor 108. In response to receiving the read request from the processor 108 via the communication interface 144, the eHSM 140 accesses the one or more secure memories 128 via the additional interconnect 204 to read data from the one or more secure memories 128. In an embodiment, the eHSM 140 encrypts the data prior to transferring the data to the processor 108 via the communication interface 144, and the processor 108 decrypts the data. If an attacker captures data being transferred via the communication interface 144, the captured data will not be useful to the attacker because the data being transferred is encrypted. Thus, encrypting the data transferred via the communication interface 144 mitigates a potential attack involving capturing data being transferred via the communication interface 144.

FIG. 3 is a flow diagram of an example method 300 for accessing an IC chip, such as an IC chip of a network device (e.g., a switch chip), according to an embodiment. The method 300 is implemented by the network device 100 of FIG. 1 or the network device 200 of FIG. 2, according to various embodiments, and the method 300 is described with reference to FIGS. 1 and 2 for explanatory purposes. In other embodiments, the method 300 is implemented by another suitable device different than the network device 100 and the network device 200. For example, the method 300 is implemented by another suitable device that includes an IC chip with unsecured component(s), secured component(s), a communication interface, an on-chip interconnect, and an eHSM similar to the corresponding components described with reference to FIGS. 1 and 2, according to an embodiment. In other embodiments, the network device 100 of FIG. 1 implements another suitable method different than the method 300, and/or the network device 200 of FIG. 2 implements another suitable method different than the method 300.

At block 304, communication interface circuitry of the IC chip receives a first access request to access a first circuitry component of the IC chip from a processor that is external to the IC chip. In an embodiment, the first access request is a first memory access request, and the first circuitry component of the IC chip is a first memory of the IC chip. For example, the communication interface 144 receives a first memory access request to access an unsecure memory 124 from the processor 108.

At block 308, interconnect circuitry of the IC chip forwards the first request to the first circuitry component of the IC chip. For example, the on-chip interconnect 156 forwards the first memory access request to the unsecure memory 124.

At block 312, the first circuitry component services the first access request via the communication interface circuitry. For example, the unsecure memory 124 services the first memory access request via the on-chip interconnect 156 and the communication interface 144. In an embodiment in which the first circuitry component is a memory and the first access request is a read request, servicing the first access request at block 144 comprises i) retrieving information from the memory in response to the read request and ii) forwarding the retrieved information to the processor via the interconnect circuitry and the communication interface. In an embodiment in which the first circuitry component is a memory and the first access request is a write request, servicing the first access request at block 144 comprises i) receiving information that is to be written to the memory in connection with the write request from the processor via the interconnect circuitry and the communication interface, and ii) writing the information to the memory.

At block 316, the interconnect circuitry blocks access requests i) that are received at the communication interface circuitry, and ii) that request access to a secured component of the IC chip. In this manner, unauthorized requests to access the secured component are thwarted, in an embodiment. Blocking access at block 316 includes preventing the communication interface circuitry from directly accessing the secured component, e.g., prevents access requests and/or data received via the communication interface circuitry from being directly provided to the secure component and prevents data from the secure component from being directly provided to the communication interface circuitry, in an embodiment. In an embodiment, the secured component is a secure memory configured to store information that is to be protected from unauthorized external access, e.g., via the communication interface 144, and the interconnect circuitry blocks memory access requests i) that are received at the communication interface circuitry, and ii) that request access to the secure memory. For example, the on-chip interconnect 156 blocks access requests i) that are received at the communication interface circuitry 144, and ii) that request access to the secured component(s) 128.

At block 320, the communication interface circuitry receives a second access request to access the secured component of the IC chip from the processor that is external to the IC chip. For example, the communication interface 144 receives a memory access request to access a secure memory 128.

At block 324, the interconnect circuitry of the IC chip forwards the second access request to embedded hardware security circuitry of the IC chip. For example, the on-chip interconnect 156 forwards a memory access request to access the secure memory 128 received via the communication interface 144 to the eHSM 140.

At block 328, in response to the second access request, the embedded hardware security circuitry provides secure access to the secured component to service the second access request. For example, the eHSM 140 provides secure access to the secured component 128 in to service the access request. Providing secure access to the secured component at block 324 comprises: performing, by the embedded hardware security circuitry, an authentication procedure with the processor external to the IC chip; providing, by the embedded hardware security circuitry, the processor with access to the secured component in response to authenticating the processor; and blocking access, by the embedded hardware security circuitry, to the secured component by the processor in response to failing to authenticate the processor, according to an embodiment.

Providing secure access to the secured component at block 324 comprises: decrypting, at the embedded hardware security circuitry, information that was received from the processor via the communication interface and that corresponds to the access request; and providing, by the embedded hardware security circuitry, the decrypted information to the secured component, in an embodiment. Providing secure access to the secured component at block 324 additionally or alternatively comprises: receiving, at the embedded hardware security circuitry, information from the secured component response to the access request; encrypting, by the embedded hardware security circuitry, the information; and transferring, by the embedded hardware security circuitry, the encrypted information to the processor via the communication interface, in an embodiment.

In an embodiment in which the second circuitry component is a memory and the second access request is a read request, providing secure access to the memory at block 324 comprises: i) receiving, at the embedded hardware security circuitry, information from the memory in response to the read request; encrypting, by the embedded hardware security circuitry, the information; and transferring, by the embedded hardware security circuitry, the encrypted information to the processor via the communication interface, in an embodiment. In an embodiment in which the secured circuitry component is a memory and the second access request is a write request, providing secure access to the memory at block 324 comprises: decrypting, at the embedded hardware security circuitry, information that was received from the processor via the communication interface and that corresponds to the write request; and providing, by the embedded hardware security circuitry, the decrypted information to the memory, in an embodiment.

At block 332, the secured circuitry component services the second access request via the embedded hardware security circuitry and the communication interface circuitry. For example, the secure memory 128 services the second access request via the eHSM 140 and the communication interface 144.

In an embodiment, servicing the second access request at block 328 comprises sending, by the secured circuitry component, information corresponding to the second access request to the embedded hardware security circuitry via the interconnect circuitry. In another embodiment, servicing the second access request at block 328 comprises sending, by the secured circuitry component, information corresponding to the second access request to the embedded hardware security circuitry via additional interconnect circuitry (e.g., the additional interconnect 204) that is separate from the interconnect circuitry. In an embodiment, servicing the second access request at block 328 comprises receiving, by the secured circuitry component, information corresponding to the second access request from the embedded hardware security circuitry via the interconnect circuitry. In another embodiment, servicing the second access request at block 328 comprises receiving, by the secured circuitry component, information corresponding to the second access request from the embedded hardware security circuitry via additional interconnect circuitry (e.g., the additional interconnect 204) that is separate from the interconnect circuitry.

In an embodiment in which the second circuitry component is a memory and the second access request is a read request, servicing the second access request at block 328 comprises: i) receiving, at the memory, the read request, ii) retrieving information corresponding to the read request from the memory, and iii) transferring the information to the embedded hardware security circuitry. In an embodiment in which the secured circuitry component is a memory and the second access request is a write request, servicing the second access request at block 328 comprises: i) receiving, at the memory, the write request and information corresponding to the write request, and ii) storing the information corresponding to the write request in the memory.

Referring again to FIGS. 1 and 2, the IC chip 104 corresponds to a single IC chip in a chip package, and the processor 108 is external to the chip package, in an embodiment. In another embodiment, components of the IC chip 104 are implemented across multiple IC chips included in a single chip package, and the processor 108 is external to the single chip package. For example, the multiple IC chips correspond to a multi-chip module (MCM), and the processor 108 is external to the MCM, in an embodiment. Thus, the terms "IC chip" and "switch chip," as used herein, may refer to multiple IC chips included in a single chip package.

Embodiment 1: An integrated circuit (IC) chip for a network device, the IC chip comprising: one or more first memories of the network device, the one or more first memories configured to store first information; one or more second memories of the network device, the one or more second memories configured to store second information that it to be protected from unauthorized access; communication interface circuitry that is configured to give a processor external to the IC chip read access and/or write access to components of the IC chip; embedded hardware security circuitry coupled to the communication interface circuitry, the embedded hardware security circuitry configured to selectively provide the processor external to the IC chip with secure access to the one or more second memories; and interconnect circuitry that is coupled to i) the one or more first memories, ii) the communication interface circuitry, and iii) the embedded hardware security circuitry, the interconnect circuitry configured to i) selectively grant the processor unsecured access to the one or more first memories via the communication interface circuitry, ii) selectively grant the processor access to the embedded hardware security, and iii) limit access to the one or more second memories.

Embodiment 2: The IC chip of embodiment 1, wherein the communication interface circuitry is configured to: receive requests to access the one or more first memories from the processor external to the IC chip; transfer unsecure first information between the processor external to the IC chip and the one or more first memories in connection with the requests to access the one or more first memories received from the processor; receive requests to access the one or more second memories from the processor external to the IC chip; and transfer encrypted second information between the processor external to the IC chip and the one or more second memories in connection with the requests to access the one or more second memories received from the processor.

Embodiment 3: The IC chip of embodiment 2, wherein the interconnect circuitry is configured to: forward requests to access the one or more first memories from the processor external to the IC chip to the one or more first memories; transfer unsecure first information between the communication interface circuitry and the one or more first memories in connection with the requests to access the one or more first memories received from the processor; block the requests to access the one or more second memories from the processor external to the IC chip from proceeding directly to the one or more second memories; forward the requests to access the one or more second memories from the processor external to the IC chip to the embedded hardware security circuitry; and transfer encrypted second information between the communication interface circuitry and the embedded hardware security circuitry in connection with the requests to access the one or more second memories received from the processor.

Embodiment 4: The IC chip of any of embodiments 1-3, wherein the embedded hardware security circuitry is configured to: perform an authentication procedure with the processor external to the IC chip; in response to the embedded hardware security circuitry determining that the processor external to the IC chip is authorized to access the one or more second memories, provide the processor external to the IC chip with secure access to the one or more second memories; and in response to the embedded hardware security circuitry determining that the processor external to the IC chip is not authorized to access the one or more second memories, prevent the processor external to the IC chip from accessing the one or more second memories.

Embodiment 5: The IC chip of any of embodiments 1-4, wherein the interconnect circuitry is further coupled to the one or more second memories; wherein the interconnect circuitry is further configured to grant the embedded hardware security circuitry access to the one or more second memories; and wherein the embedded hardware security circuitry is configured to use the interconnect circuitry to provide the processor external to the IC chip with secure access to the one or more second memories.

Embodiment 6: The IC chip of any of embodiments 1-4, wherein the interconnect circuitry is first interconnect circuitry; wherein the IC chip further comprises second interconnect circuitry coupled to the embedded hardware security circuitry and the one or more second memories; and wherein the embedded hardware security circuitry is configured to use the second interconnect circuitry to provide the processor external to the IC chip with secure access to the one or more second memories.

Embodiment 7: The IC chip of any of embodiments 1-6, wherein the interconnect circuitry is configured to block requests to access the one or more second memories from the processor external to the IC chip from proceeding directly to the one or more second memories.

Embodiment 8: The IC chip of any of embodiments 1-7, wherein the embedded hardware security circuitry is configured to provide the processor external to the IC chip with secure access to the one or more second memories at least by i) authenticating the processor external to the IC chip, and ii) in response to authenticating the processor external to the IC chip, providing the processor external to the IC chip with access to the one or more second memories.

Embodiment 9: The IC chip of embodiment 8, wherein the embedded hardware security circuitry is configured to provide the processor external to the IC chip with secure access to the one or more second memories further by: in response to failing to authenticate the processor external to the IC chip, block access by the processor to the one or more second memories.

Embodiment 10: The IC chip of any of embodiments 1-9, wherein the embedded hardware security circuitry comprises encryption/decryption circuitry, and wherein the embedded hardware security circuitry is configured to provide the processor external to the IC chip with secure access to the one or more second memories at least by one or both of: decrypting, by the encryption/decryption circuitry, first information from the processor that corresponds to an access request from the processor that was received via the communication interface circuitry to generate decrypted information, and transferring the decrypted information to the one or more second memories; and encrypting, by the encryption/decryption circuitry, second information from the one or more second memories that corresponds to a response to an access request that was received from the processor via the communication interface circuitry to generate encrypted information, and transferring the encrypted information to the processor via the communication interface circuitry.

Embodiment 11: The IC chip of any of embodiments 1-10, wherein: the one or more second memories comprise a key memory configured to store security keys for encrypting data output by the IC chip and/or decrypting data received by the IC chip; the IC chip further comprises encryption/decryption circuitry configured to perform one or both of encrypting data output by the IC chip and decrypting data received by the IC chip using security keys stored in the key memory; and the embedded hardware security circuitry is configured to provide the processor with secure access to the key memory to store security keys in the key memory.

Embodiment 12: The IC chip of any of embodiments 1-11, further comprising: a plurality of network interfaces configured to communicatively couple to ports of a network device; and a packet processor configured to analyze headers of packets received via the plurality of network interfaces to determine network interfaces via which the packets are to be forwarded, the packet processor coupled to the interconnect circuitry; wherein the interconnect circuitry is configured to selectively grant the packet processor unsecured access to the one or more first memories to read from and/or write to the one or more first memories in connection with determining network interfaces via which the packets are to be forwarded.

Embodiment 13: The IC chip of any of embodiments 1-12, wherein: the one or more second memories comprise a forwarding database memory configured to store forwarding information that is used by the packet processor to determine network interfaces via which the packets are to be forwarded; and the embedded hardware security circuitry is configured to provide the processor with secure access to the key memory to read forwarding information from the forwarding database memory and to transfer the forwarding information to the processor via the communication interface circuitry in a secure manner.

Embodiment 14: A method for accessing an integrated circuit (IC) chip of a network device, the method comprising: receiving, at communication interface circuitry of the IC chip, a first memory access request to access a first memory of the IC chip from a processor that is external to the IC chip, the first memory storing information for use by the network device; forwarding, by interconnect circuitry of the IC chip, the first request to the first memory; servicing, by the first memory, the first memory access request via the communication interface circuitry; blocking, at the interconnect circuitry, direct access to a second memory of the IC chip via the communication interface circuitry in response to requests i) that are received at the communication interface circuitry, and ii) that request access to the second memory of the IC chip, the second memory configured to store information for use by the network device and that it to be protected from unauthorized external access; receiving, at communication interface circuitry of the IC chip, a second memory access request to access the second memory of the IC chip from the processor that is external to the IC chip; forwarding, by the interconnect circuitry of the IC chip, the second request to embedded hardware security circuitry of the IC chip; selectively providing, by the embedded hardware security circuitry, secure access to the second memory to service the second memory access request; and servicing, by the second memory, the second memory access request via the embedded hardware security circuitry and the communication interface circuitry.

Embodiment 15: The method for accessing the IC chip of embodiment 14, further comprising: transferring, via the communication interface circuitry, unsecure first information between the processor external to the IC chip and the one or more first memories in connection with the requests to access the one or more first memories received from the processor; transferring, via the communication interface circuitry, encrypted second information between the processor external to the IC chip and the one or more second memories in connection with the requests to access the one or more second memories received from the processor.

Embodiment 16: The method for accessing the IC chip of embodiment 15, further comprising: transferring, via the interconnect circuitry, unsecure first information between the communication interface circuitry and the one or more first memories in connection with the requests to access the one or more first memories received from the processor; and transferring, via the interconnect circuitry, encrypted second information between the communication interface circuitry and the embedded hardware security circuitry in connection with the requests to access the one or more second memories received from the processor.

Embodiment 17: The method for accessing the IC chip of any of embodiments 14-16, wherein selectively providing secure access to the second memory comprises: performing, by the embedded hardware security circuitry, an authentication procedure with the processor external to the IC chip; in response to the embedded hardware security circuitry determining that the processor external to the IC chip is authorized to access the one or more second memories, providing, by the embedded hardware security circuitry, the processor external to the IC chip with secure access to the one or more second memories; and in response to the embedded hardware security circuitry determining that the processor external to the IC chip is not authorized to access the one or more second memories, preventing, by the embedded hardware security circuitry, the processor external to the IC chip from accessing the one or more second memories.

Embodiment 18: The method for accessing the IC chip of any of embodiments 14-17, further comprising: granting, by the interconnect circuitry, the embedded hardware security circuitry access to the one or more second memories; and wherein providing secure access to the second memory to service the second memory access request comprises using, by the embedded hardware security circuitry, the interconnect circuitry to provide the processor external to the IC chip with secure access to the one or more second memories.

Embodiment 19: The method for accessing the IC chip of any of embodiments 14-17, wherein: the interconnect circuitry is first interconnect circuitry; and providing secure access to the second memory to service the second memory access request comprises using, by the embedded hardware security circuitry, second interconnect circuitry to provide the processor external to the IC chip with secure access to the one or more second memories, the second interconnect circuitry distinct from the first interconnect circuitry.

Embodiment 20: The method for accessing the IC chip of any of embodiments 14-19, wherein providing secure access to the second memory to service the second memory access request comprises: authenticating the processor external to the IC chip; and in response to authenticating the processor external to the IC chip, providing, by the embedded hardware security circuitry, the processor external to the IC chip with access to the one or more second memories.

Embodiment 21: The method for accessing the IC chip of embodiment 20, wherein providing secure access to the second memory to service the second memory access request comprises: in response to failing to authenticate the processor external to the IC chip, blocking, by the embedded hardware security circuitry, access by the processor to the one or more second memories.

Embodiment 22: The method for accessing the IC chip of any of embodiments 14-21, wherein providing secure access to the second memory to service the second memory access request comprises one or both of: i) decrypting, by encryption/decryption circuitry of the embedded hardware security circuitry, first information from the processor that corresponds to an access request from the processor that was received via the communication interface circuitry to generate decrypted information, and transferring the decrypted information to the one or more second memories; and ii) encrypting, by the encryption/decryption circuitry, second information from the one or more second memories that corresponds to a response to an access request that was received from the processor via the communication interface circuitry to generate encrypted information, and transferring the encrypted information to the processor via the communication interface circuitry.

Embodiment 23: The method for accessing the IC chip of any of embodiments 14-22, wherein the one or more second memories comprise a key memory configured to store security keys, and wherein the method further comprises: encrypting, using encryption circuitry of the IC chip, information output by the IC chip using security keys stored in the key memory; wherein providing secure access to the second memory to service the second memory access request comprises providing, by the embedded hardware security circuitry, the processor with secure access to the key memory to store security keys in the key memory.

Embodiment 24: The method for accessing the IC chip of any of embodiments 14-23, wherein the one or more second memories comprise a key memory configured to store security keys, and wherein the method further comprises: decrypting, using decryption circuitry of the IC chip, information received by the IC chip using security keys stored in the key memory; wherein providing secure access to the second memory to service the second memory access request comprises providing, by the embedded hardware security circuitry, the processor with secure access to the key memory to store security keys in the key memory.

Embodiment 25: The method for accessing the IC chip of any of embodiments 14-24, further comprising: receiving, via a plurality of network interfaces of the IC chip, packets; and analyzing, at a packet processor, headers of the packets received via the plurality of network interfaces to determine network interfaces via which the packets are to be forwarded; and forwarding, by the packet processor, packets to the network interfaces determined by the packet processor for transmission by the network interfaces.

Embodiment 26: The method for accessing the IC chip of embodiment 25, wherein: the one or more second memories comprise a forwarding database memory configured to store forwarding information that is used by the packet processor to determine network interfaces via which the packets are to be forwarded; and wherein providing secure access to the second memory to service the second memory access request comprises providing, by the embedded hardware security circuitry, the processor with secure access to the key memory to read forwarding information from the forwarding database memory.

Some of the various blocks, operations, and techniques described above may be implemented utilizing hardware, a processor executing firmware instructions, a processor executing software instructions, or any suitable combination thereof. When implemented utilizing a processor executing software or firmware instructions, the software or firmware instructions may be stored in any suitable computer readable memory. The software or firmware instructions may include machine readable instructions that, when executed by one or more processors, cause the one or more processors to perform various acts such as described above.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. An integrated circuit (IC) chip for a network device, the IC chip comprising:

one or more first memories of the network device, the one or more first memories configured to store first information;

one or more second memories of the network device, the one or more second memories configured to store second information that is to be protected from unauthorized access;

communication interface circuitry that is configured to give a processor external to the IC chip read access and/or write access to components of the IC chip;

embedded hardware security circuitry coupled to the communication interface circuitry, the embedded hardware security circuitry configured to selectively provide the processor external to the IC chip with secure access to the one or more second memories; and interconnect circuitry that is coupled to i) the one or more first memories, ii) the one or more second memories, iii) the communication interface circuitry, and iv) the embedded hardware security circuitry, the interconnect circuitry configured to i) selectively grant the processor unsecured access to the one or more first memories via the communication interface circuitry, ii) selectively grant the processor access to the embedded hardware security, and iii) limit access to the one or more second memories while providing the embedded hardware security circuitry access to the one or more second memories;

wherein the embedded hardware security circuitry is configured to use the interconnect circuitry to provide the processor external to the IC chip with secure access to the one or more second memories.

2. The IC chip of claim 1, wherein the communication interface circuitry is configured to:

receive requests to access the one or more first memories from the processor external to the IC chip;

transfer unsecure first information between the processor external to the IC chip and the one or more first memories in connection with the requests to access the one or more first memories received from the processor;

receive requests to access the one or more second memories from the processor external to the IC chip; and transfer encrypted second information between the processor external to the IC chip and the one or more second memories in connection with the requests to access the one or more second memories received from the processor.

3. The IC chip of claim 2, wherein the interconnect circuitry is configured to:

forward requests to access the one or more first memories from the processor external to the IC chip to the one or more first memories;

transfer unsecure first information between the communication interface circuitry and the one or more first memories in connection with the requests to access the one or more first memories received from the processor;

block the requests to access the one or more second memories from the processor external to the IC chip from proceeding directly to the one or more second memories;

forward the requests to access the one or more second memories from the processor external to the IC chip to the embedded hardware security circuitry; and transfer encrypted second information between the communication interface circuitry and the embedded hardware security circuitry in connection with the requests to access the one or more second memories received from the processor.

4. The IC chip of claim 1, wherein the embedded hardware security circuitry is configured to:

perform an authentication procedure with the processor external to the IC chip;

in response to the embedded hardware security circuitry determining that the processor external to the IC chip is authorized to access the one or more second memories, provide the processor external to the IC chip with secure access to the one or more second memories; and in response to the embedded hardware security circuitry determining that the processor external to the IC chip is not authorized to access the one or more second memories, prevent the processor external to the IC chip from accessing the one or more second memories.

5. The IC chip of claim 1, wherein the interconnect circuitry is configured to block requests to access the one or more second memories from the processor external to the IC chip from proceeding directly to the one or more second memories.

6. The IC chip of claim 1, wherein the embedded hardware security circuitry is configured to provide the processor external to the IC chip with secure access to the one or more second memories at least by i) authenticating the processor external to the IC chip, and ii) in response to authenticating the processor external to the IC chip, providing the processor external to the IC chip with access to the one or more second memories.

7. The IC chip of claim 6, wherein the embedded hardware security circuitry is configured to provide the processor external to the IC chip with secure access to the one or more second memories further by: in response to failing to authenticate the processor external to the IC chip, block access by the processor to the one or more second memories.

8. The IC chip of claim 1, wherein the embedded hardware security circuitry comprises encryption/decryption circuitry, and wherein the embedded hardware security circuitry is configured to provide the processor external to the IC chip with secure access to the one or more second memories at least by one or both of:

decrypting, by the encryption/decryption circuitry, first information from the processor that corresponds to an access request from the processor that was received via the communication interface circuitry to generate decrypted information, and transferring the decrypted information to the one or more second memories; and encrypting, by the encryption/decryption circuitry, second information from the one or more second memories that corresponds to a response to an access request that was received from the processor via the communication interface circuitry to generate encrypted information, and transferring the encrypted information to the processor via the communication interface circuitry.

9. The IC chip of claim 1, wherein:

the one or more second memories comprise a key memory configured to store security keys for encrypting data output by the IC chip and/or decrypting data received by the IC chip;

the IC chip further comprises encryption/decryption circuitry configured to perform one or both of encrypting data output by the IC chip and decrypting data received by the IC chip using security keys stored in the key memory; and the embedded hardware security circuitry is configured to provide the processor with secure access to the key memory to store security keys in the key memory.

10. The IC chip of claim 1, further comprising:

a plurality of network interfaces configured to communicatively couple to ports of a network device; and a packet processor configured to analyze headers of packets received via the plurality of network interfaces to determine network interfaces via which the packets are to be forwarded, the packet processor coupled to the interconnect circuitry;

wherein the interconnect circuitry is configured to selectively grant the packet processor unsecured access to the one or more first memories to read from and/or write to the one or more first memories in connection with determining network interfaces via which the packets are to be forwarded.

11. The IC chip of claim 10, wherein:

the one or more second memories comprise a forwarding database memory configured to store forwarding information that is used by the packet processor to determine network interfaces via which the packets are to be forwarded; and the embedded hardware security circuitry is configured to provide the processor with secure access to the key memory to read forwarding information from the forwarding database memory and to transfer the forwarding information to the processor via the communication interface circuitry in a secure manner.

12. A method for accessing an integrated circuit (IC) chip of a network device, the method comprising:

receiving, at communication interface circuitry of the IC chip, a first memory access request to access a first memory of the IC chip from a processor that is external to the IC chip, the first memory storing information for use by the network device;

forwarding, by interconnect circuitry of the IC chip, the first request to the first memory;

servicing, by the first memory, the first memory access request via the communication interface circuitry;

blocking, at the interconnect circuitry, direct access to a second memory of the IC chip via the communication interface circuitry in response to requests i) that are received at the communication interface circuitry, and ii) that request access to the second memory of the IC chip, the second memory configured to store information for use by the network device and that is to be protected from unauthorized external access;

receiving, at communication interface circuitry of the IC chip, a second memory access request to access the second memory of the IC chip from the processor that is external to the IC chip;

forwarding, by the interconnect circuitry of the IC chip, the second request to embedded hardware security circuitry of the IC chip;

granting, by the interconnect circuitry of the IC chip, the embedded hardware security circuitry access to the one or more second memories;

selectively providing, by the embedded hardware security circuitry, secure access to the second memory to service the second memory access request using the interconnect circuitry; and servicing, by the second memory, the second memory access request via the embedded hardware security circuitry and the communication interface circuitry.

13. The method for accessing the IC chip of claim 12, further comprising:

transferring, via the communication interface circuitry, unsecure first information between the processor external to the IC chip and the one or more first memories in connection with the requests to access the one or more first memories received from the processor;

transferring, via the communication interface circuitry, encrypted second information between the processor external to the IC chip and the one or more second memories in connection with the requests to access the one or more second memories received from the processor.

14. The method for accessing the IC chip of claim 13, further comprising:

transferring, via the interconnect circuitry, unsecure first information between the communication interface circuitry and the one or more first memories in connection with the requests to access the one or more first memories received from the processor; and transferring, via the interconnect circuitry, encrypted second information between the communication interface circuitry and the embedded hardware security circuitry in connection with the requests to access the one or more second memories received from the processor.

15. The method for accessing the IC chip of claim 12, wherein selectively providing secure access to the second memory comprises:

performing, by the embedded hardware security circuitry, an authentication procedure with the processor external to the IC chip;

in response to the embedded hardware security circuitry determining that the processor external to the IC chip is authorized to access the one or more second memories, providing, by the embedded hardware security circuitry, the processor external to the IC chip with secure access to the one or more second memories; and in response to the embedded hardware security circuitry determining that the processor external to the IC chip is not authorized to access the one or more second memories, preventing, by the embedded hardware security circuitry, the processor external to the IC chip from accessing the one or more second memories.

16. The method for accessing the IC chip of claim 12, wherein providing secure access to the second memory to service the second memory access request comprises:

authenticating the processor external to the IC chip; and in response to authenticating the processor external to the IC chip, providing, by the embedded hardware security circuitry, the processor external to the IC chip with access to the one or more second memories.

17. The method for accessing the IC chip of claim 16, wherein providing secure access to the second memory to service the second memory access request comprises:

in response to failing to authenticate the processor external to the IC chip, blocking, by the embedded hardware security circuitry, access by the processor to the one or more second memories.

18. The method for accessing the IC chip of claim 12, wherein providing secure access to the second memory to service the second memory access request comprises one or both of:

i) decrypting, by encryption/decryption circuitry of the embedded hardware security circuitry, first information from the processor that corresponds to an access request from the processor that was received via the communication interface circuitry to generate decrypted information, and transferring the decrypted information to the one or more second memories; and ii) encrypting, by the encryption/decryption circuitry, second information from the one or more second memories that corresponds to a response to an access request that was received from the processor via the communication interface circuitry to generate encrypted information, and transferring the encrypted information to the processor via the communication interface circuitry.

19. The method for accessing the IC chip of claim 12, wherein the one or more second memories comprise a key memory configured to store security keys, and wherein the method further comprises:

encrypting, using encryption circuitry of the IC chip, information output by the IC chip using security keys stored in the key memory;

wherein providing secure access to the second memory to service the second memory access request comprises providing, by the embedded hardware security circuitry, the processor with secure access to the key memory to store security keys in the key memory.

20. The method for accessing the IC chip of claim 12, wherein the one or more second memories comprise a key memory configured to store security keys, and wherein the method further comprises:

decrypting, using decryption circuitry of the IC chip, information received by the IC chip using security keys stored in the key memory;

wherein providing secure access to the second memory to service the second memory access request comprises providing, by the embedded hardware security circuitry, the processor with secure access to the key memory to store security keys in the key memory.

21. The method for accessing the IC chip of claim 12, further comprising:

receiving, via a plurality of network interfaces of the IC chip, packets; and analyzing, at a packet processor, headers of the packets received via the plurality of network interfaces to determine network interfaces via which the packets are to be forwarded; and forwarding, by the packet processor, packets to the network interfaces determined by the packet processor for transmission by the network interfaces.

22. The method for accessing the IC chip of claim 21, wherein:

the one or more second memories comprise a forwarding database memory configured to store forwarding information that is used by the packet processor to determine network interfaces via which the packets are to be forwarded; and wherein providing secure access to the second memory to service the second memory access request comprises providing, by the embedded hardware security circuitry, the processor with secure access to the key memory to read forwarding information from the forwarding database memory.

* * * * *